April 19, 1932. E. G. SOHLBERG 1,854,961
CLOSED VENTILATING SYSTEM FOR DYNAMO ELECTRIC MACHINES
Filed July 30, 1930
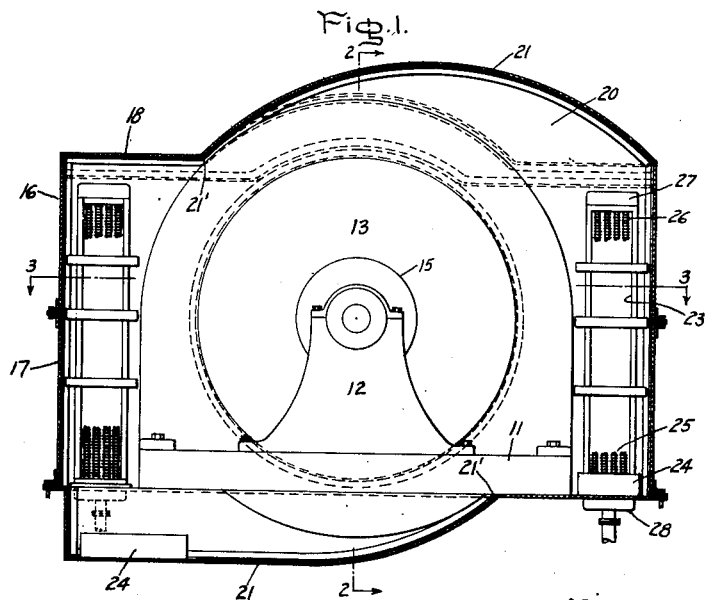
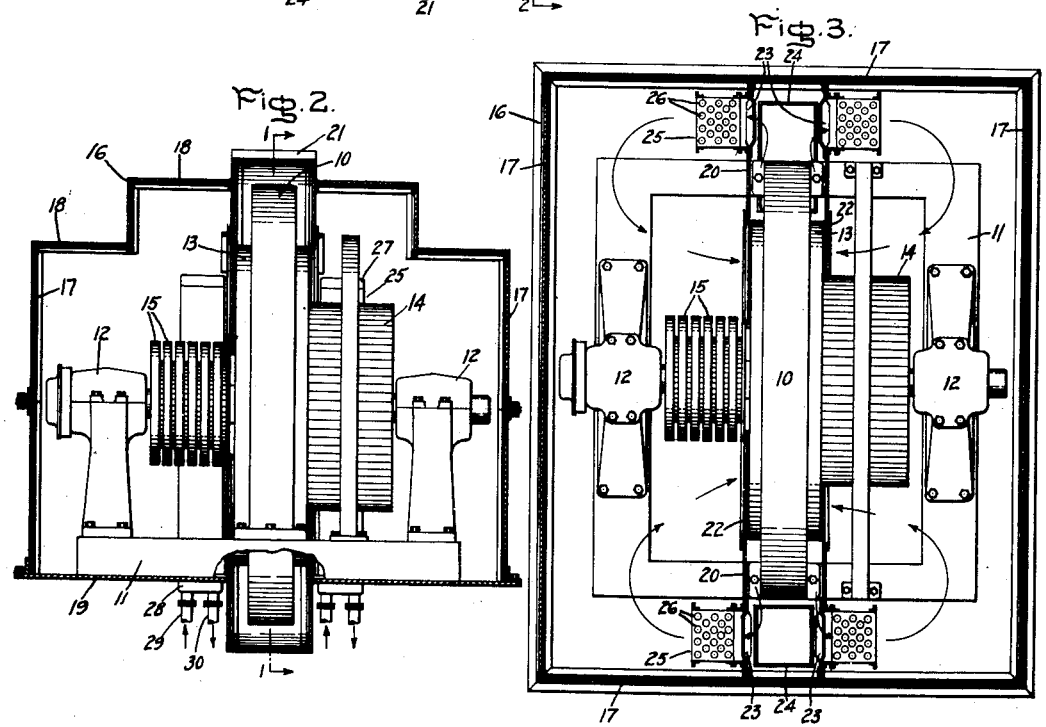
Inventor:
Erik G. Sohlberg, Deceased
Margaret M. T. Sohlberg, Executrix
by Charles V. Tulla
Her Attorney.

Patented Apr. 19, 1932

1,854,961

UNITED STATES PATENT OFFICE

ERIK G. SOHLBERG, DECEASED, LATE OF SCHENECTADY, NEW YORK, BY MARGARET M. T. SOHLBERG, EXECUTRIX, OF SCHENECTADY, NEW YORK, ASSIGNOR TO GENERAL ELECTRIC COMPANY, A CORPORATION OF NEW YORK

CLOSED VENTILATING SYSTEM FOR DYNAMO-ELECTRIC MACHINES

Application filed July 30, 1930. Serial No. 471,708.

This invention relates to closed ventilating systems for dynamo-electric machines.

In dynamo-electric machines of the type in which the rotatable member thereof projects air outwardly about the stationary member, and low pressure areas are created at the ends of the rotatable member, the closed ventilating systems employed have not effectively utilized the kinetic energy of the cooling gas projected outwardly by the rotatable member about the stationary member and the low pressure areas at the ends of the rotatable member for circulating the cooling gas through the ventilating system associated with the machines. The object of this invention is to provide a closed ventilating system for a machine of this type in which the kinetic energy of the air projected outwardly by the rotatable member and the low pressure areas at the ends of the rotatable member are utilized for obtaining an adequate circulation of the cooling gas through the ventilating system. This is accomplished by providing a closed ventilating system for a machine of the above-mentioned type comprising a housing enclosing the machine including a casing having an intake adjacent the periphery of the rotatable member which communicates with the remainder of the housing.

This invention will be more fully set forth in the following description referring to the accompanying drawings, and the features of novelty which characterize the invention will be pointed out with particularity in the claims annexed to and forming a part of this specification.

In the drawings Fig. 1 is a sectional view approximately on the line 1—1 of Fig. 2; and Figs. 2 and 3 are sectional views on lines 2—2 and 3—3 respectively of Fig. 1, the dynamo-electric machine being shown in elevation and plan respectively.

Referring to the drawings, the improved ventilating system is shown in connection with a rotary converter including a magnet frame 10 which is supported on a rectangular base 11 having bearings 12 in which the armature or rotatable member 13 of the machine is supported. The machine is connected to external circuits by current-collecting devices associated with a commutator 14 and slip rings 15 which are connected in the usual manner to windings on the armature. The armature or rotatable member 13 of the machine projects cooling gas outwardly about the magnet frame at high velocity and creates low pressure areas at the ends of the rotatable member. Actual test has shown that the kinetic energy or velocity head of the cooling gas projected outwardly in this manner and the low pressure areas are sufficient, if properly utilized, to circulate the cooling gas through a closed ventilating system associated with the machine.

In accordance with this invention, therefore, the energy of the cooling gas projected outwardly by the rotatable member and the low pressure areas are utilized to circulate the gas through the ventilating system by providing a housing enclosing the machine including a casing having an intake opening adjacent the periphery of the rotatable member and a discharge opening communicating with the remainder of the housing, the casing converting the velocity head of the cooling gas projected outwardly by the rotatable member into a pressure head, so that the cooling gas circulates from the casing through the housing and into the low pressure areas at the ends of the machine, as is indicated by the arrows in Fig. 3.

In the particular closed ventilating system, which is illustrated as an example of one manner of carrying out the invention, a rectangular housing 16 is provided having side walls 17, top walls 18, and a bottom wall 19 entirely enclosing the machine. This housing is filled with air, hydrogen, or other suitable cooling gas. In order to effectively preserve the velocity head of the cooling gas and convert the same into a pressure head to circulate the gas from the casing into the low pressure areas at the ends of the machine the housing is provided with partitions 20 extending transversely of the axis of the machine substantially at the ends of the rotatable member 13 and spaced slightly from the magnet frame so that they form a casing 21 and direct the cooling gas projected outwardly by the rotatable member into the casing. Cooling gas is admitted to the low pressure areas or chambers at the ends of the rotatable member 13 from the housing by providing openings 22 in the partition walls 20 which are slightly larger than the outside diameter of the rotatable member 13, so that an annular intake to the casing 21 is provided substantially at the periphery of the rotatable member. The velocity head of the gas passing into the casing is converted into a pressure head and flows through openings 23 formed in the partition walls 20 into the housing and returns through openings 22 into the ends of the rotatable member of the machine. The amount of cooling gas carried by the casing increases from the points 21' on the periphery of the magnet frame toward the openings 23 and in order therefore to preserve the velocity head of the cooling gas flowing in the casing the size thereof is increased from points 21' on the periphery of the magnet frame toward the openings 23.

If, during operation of the machine, dust from the commutator and slip rings and other foreign particles are permitted to recirculate through the machine, they are likely to accumulate in the windings and cause short circuits therein. For this reason pans 24 are provided in the lower portion of the casing 21 adjacent the openings 23. These pans contain oil or other suitable dust binding liquid. Upon striking the surface of the oil in these pans the cooling gas deposits any dust carried thereby on the oil and is deflected toward the openings 23.

The gas circulated in this closed ventilating system may be cooled in any desired manner, but it is preferred to arrange coolers 25 at the openings 23 in the partition walls 20 through which the cooling gas must flow in passing from the casing 21 formed by the partition walls 20 into the housing 16. These coolers include a plurality of vertical finned tubes 26 which are connected at their upper ends by headers 27, and at their lower ends by headers 28. The headers 28 are preferably provided with a water supply connection 29 and an outlet connection 30 which are separated by a partition. One group of the tubes 26 conduct cooling water from the connections 29 to the holders 27 and another group of these tubes conduct cooling water from the header 27 to the outlet connection 30. By this arrangement the flow of cooling water through the finned tubes 26 reduces their temperature sufficiently to cool the gas circulated within the system during operation of the machine.

Although this invention is shown in connection with a particular type of dynamo-electric machine, it is not desired to be limited thereto, and it is intended in the appended claims to cover all modifications which do not depart from the spirit and scope of this invention.

What is claimed as new and desired to be secured by Letters Patent of the United States is:

1. In combination with a dynamo-electric machine having a stationary member and a rotatable member arranged to project cooling gas outwardly about said stationary member, a closed ventilating system for said machine comprising a casing having an intake opening adjacent the periphery of said rotatable member, and a housing enclosing said machine, said casing extending transversely of the axis of the machine across said housing and communicating therewith so that cooling gas circulates from said casing through said housing and into the end of said machine.

2. In combination with a dynamo-electric machine having a stationary member and a rotatable member arranged to project cooling gas outwardly about said stationary member, a closed ventilating system for said machine, comprising a casing having an intake opening adjacent the periphery of said rotatable member, a housing enclosing said machine, said casing communicating with said housing so that cooling gas circulates from said casing through said housing and into the end of said machine, said casing cooperating with said machine and said housing to divide said housing into low pressure chambers at opposite ends of said machine and a cooler arranged in the path of the circulating cooling gas.

3. In combination with a dynamo-electric machine having a stationary member and a rotatable member arranged to project cooling gas outwardly about said stationary member, a closed ventilating system for said machine comprising a casing having an annular intake opening adjacent the periphery of said rotatable member for utilizing the velocity head imparted to the cooling gas to circulate the same in the system, and a housing enclosing said machine, said casing surrounding said machine and extending transversely of said housing said casing communicating with said housing so that cooling gas circulates from said casing through said housing and into the end of said machine.

4. In combination with a dynamo-electric machine having a stationary member and a rotatable member extending beyond the ends of said stationary member and arranged to impel cooling gas outwardly therefrom, a closed ventilating system for said machine comprising a casing arranged about said stationary member in spaced relation thereto and having side walls terminating adjacent the periphery of said rotatable member for deflecting the cooling gas impelled outwardly thereby into said casing, and a housing enclosing said machine, said casing having openings in the side walls affording a path for the circulation of cooling gas therefrom through said housing and into the end of said machine.

5. In combination with a dynamo-electric machine having a stationary member and a rotatable member extending beyond the ends of said stationary member and arranged to impel cooling gas outwardly therefrom, a closed ventilating system for said machine comprising a casing arranged about said stationary member in spaced relation thereto and having side walls terminating adjacent the periphery of said rotatable member for deflecting the cooling gas impelled outwardly thereby into said casing, a housing enclosing said machine, said casing having openings in the side walls affording a path for the circulation of cooling gas therefrom through said housing and into the end of said machine, and coolers arranged in said housing adjacent the openings in said casing.

6. In combination with a dynamo-electric machine having a stationary member and a rotatable member arranged to impel air outwardly about said stationary member, a closed ventilating system for said machine comprising a casing surrounding said stationary member in spaced relation thereto and having an opening at the end of said rotatable member, said casing increasing in cross-section in the direction of rotation of said rotatable member to convert the velocity head of the air impelled by said rotatable member into pressure head for circulating gas through said system and having openings at the enlarged portion thereof, and a housing cooperating with said casing to enclose said machine and extending about the openings therein for directing air from said casing into the ends of said rotatable member.

7. In combination with a dynamo-electric machine having a stationary member and a rotatable member arranged to impel a cooling gas outwardly about said stationary member, a closed ventilating system for said machine comprising a casing surrounding said stationary member in spaced relation thereto and having an opening at the end of said rotatable member, said casing increasing in cross-section in the direction of rotation of said rotatable member to convert the velocity head of the air impelled by said rotatable member into pressure head for circulating gas through said system and having openings at the enlarged portion thereof, a housing cooperating with said casing and extending about the opening therein for directing air from said casing into the ends of said rotatable member, and coolers adjacent the openings in said casing.

8. In combination with a dynamo-electric machine having a stationary member and a rotatable member arranged to impel a cooling gas outwardly about said stationary member, a closed ventilating system for said machine comprising a casing surrounding said stationary member in spaced relation thereto and having an opening substantially the size of said rotatable member and closely adjacent thereto to provide for the admission of cooling gas to the end of said rotatable member and deflection of the high velocity stream of air from said rotatable member into said casing, said casing increasing in cross-section in the direction of rotation of said rotatable member to convert the velocity head of the air impelled outwardly by said rotatable member into pressure head for circulating gas through said system, said casing having openings at the enlarged portion thereof, coolers adjacent said openings, and a housing cooperating with said casing to enclose said machine and to direct air from said casing into the end of said rotatable member.

In witness whereof, I have hereunto set my hand this 29th day of July, 1930.

MARGARET M. T. SOHLBERG,
*Executrix of Erik G. Sohlberg, Deceased.*